(12) United States Patent
Rosenberg et al.

(10) Patent No.: US 9,065,726 B2
(45) Date of Patent: Jun. 23, 2015

(54) METHODS AND APPARATUS TO UTILIZE ROUTE PARAMETER SETS FOR EXCHANGING ROUTES IN A COMMUNICATION NETWORK

(75) Inventors: Eric Rosenberg, Lincroft, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

(21) Appl. No.: 12/907,232

(22) Filed: Oct. 19, 2010

(65) Prior Publication Data

US 2012/0093154 A1    Apr. 19, 2012

(51) Int. Cl.
*H04L 12/751* (2013.01)
*H04L 12/715* (2013.01)
*H04L 12/741* (2013.01)
*H04L 12/801* (2013.01)
*H04L 29/06* (2006.01)

(52) U.S. Cl.
CPC ............... *H04L 45/04* (2013.01); *H04L 45/54* (2013.01); *H04L 45/02* (2013.01); *H04L 47/10* (2013.01); *H04L 29/06* (2013.01)

(58) Field of Classification Search
CPC combination set(s) only.
See application file for complete search history.

(56) References Cited

U.S. PATENT DOCUMENTS

| | | | |
|---|---|---|---|
| 6,018,524 A | 1/2000 | Turner et al. | |
| 6,392,997 B1 * | 5/2002 | Chen | 370/252 |
| 6,594,655 B2 | 7/2003 | Tal et al. | |
| 6,978,309 B1 * | 12/2005 | Dorbolo | 709/231 |
| 7,457,251 B1 * | 11/2008 | Chen | 370/252 |
| 7,647,426 B2 | 1/2010 | Patel et al. | |
| 8,184,540 B1 * | 5/2012 | Perla et al. | 370/235 |
| 2006/0002406 A1 * | 1/2006 | Ishihara et al. | 370/401 |
| 2008/0084880 A1 | 4/2008 | Dharwadkar | |
| 2008/0084881 A1 * | 4/2008 | Dharwadkar et al. | 370/392 |
| 2010/0135304 A1 * | 6/2010 | Mulligan et al. | 370/395.3 |

* cited by examiner

*Primary Examiner* — Alpus H Hsu
*Assistant Examiner* — Yee Lam
(74) *Attorney, Agent, or Firm* — Hanley, Flight & Zimmerman, LLC

(57) ABSTRACT

Methods and apparatus to utilize route parameter sets for exchanging routes in a communication network are disclosed. An example method to exchange routes in a communication network disclosed herein comprises receiving a route comprising a route identifier identifying the route and a plurality of route parameter values characterizing the route, and sending the route identifier and a pointer to forward the route to a recipient in the communication network, the pointer being associated with a route parameter set comprising the plurality of route parameter values.

18 Claims, 7 Drawing Sheets

METHODS AND APPARATUS TO UTILIZE ROUTE PARAMETER SETS FOR EXCHANGING ROUTES IN A COMMUNICATION NETWORK

FIELD OF THE DISCLOSURE

This disclosure relates generally to communication networks and, more particularly, to methods and apparatus to utilize route parameter sets for exchanging routes in a communication network.

BACKGROUND

Many service provider networks employ a set of provider edge (PE) routers that define the provider side edge of the network. Each PE router interfaces with customer premises equipment (CPE) located at one or more customer sites served by the PE router. Service provider networks often provide virtual private network (VPN) services to interconnect different customer sites in a secure and private manner. To implement one or more VPNs between these customer sites, the PE routers communicatively coupled with the CPE at the different customer sites exchange routing information (also referred to as routes). Because each PE router can be connected to many CPE at many different customer sites, and each of these CPE can be part of a different VPN interconnecting with other CPE(s) at some other customer site(s), each PE router may support multiple VPNs and potentially need to communicate routes to any of the other PE routers in the service provider network. In smaller networks, a full mesh of PE routers is implemented to enable any PE router to exchange routes with any other PE router in the network. However, because full mesh implementations may not scale well, larger networks often employ route reflectors to exchange routes between PE routers.

In at least some service provider networks, a route reflector connects to the PE routers in the service provider network using interior border gateway protocol (iBGP) sessions. Each PE router uses iBGP to send routes to the route reflector for each VPN supported by the PE router. Additionally, each PE router uses iBGP to receive via the route reflector the routes from other PE routers in the network for each VPN the PE router supports. In an iBGP implementation, a route is a collection of objects, including a prefix and a set of route parameters, and a typical route reflector can maintain hundreds of thousands, or even millions, of routes.

DETAILED DESCRIPTION

Figure 1:
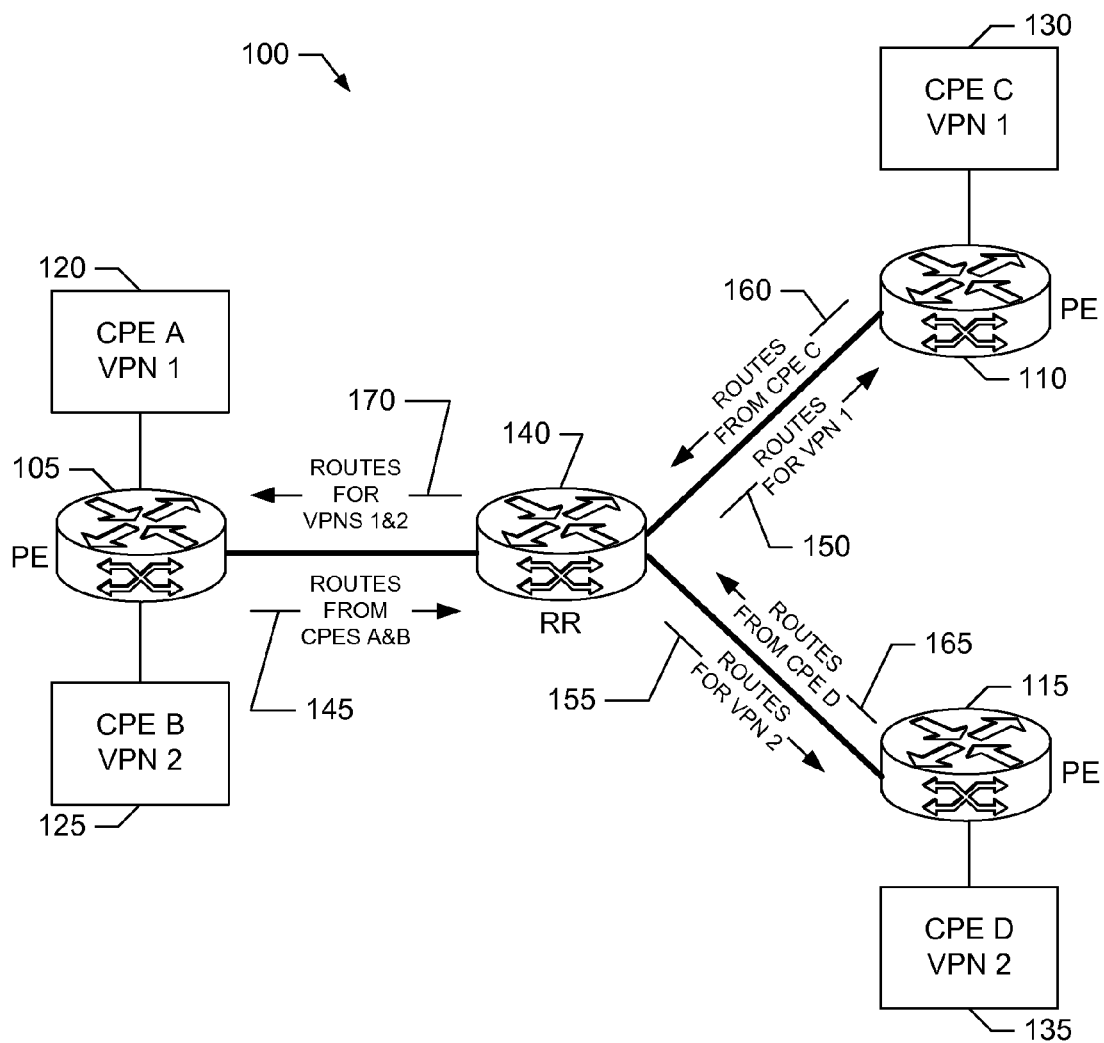
FIG. 1 is block diagram of an example service provider network in which route parameter sets can be utilized to exchange routes in accordance with the methods and apparatus described herein.

Methods and apparatus to utilize route parameter sets for exchanging routes in a communication network are disclosed herein. To this end, an example method disclosed herein for exchanging routes in a communication network involves receiving a route (e.g., from CPE or a PE router) including a route identifier identifying the route and a plurality of route parameter values characterizing the route. For example, the route identifier can correspond to a border gateway protocol (BGP) route prefix representing a collection of destination Internet protocol (IP) addresses supported by the route, and the route parameters can correspond to BGP route objects, such as BGP attributes, metrics, etc. To forward the route to a recipient in the communication network (e.g., a route reflector or another PE router), the example method further involves sending the route identifier and a pointer to the recipient (e.g., instead of the plurality of route parameter values), with the pointer being associated with a route parameter set containing the plurality of route parameter values. In some examples, such as when the route parameter set is one of many possible route parameter sets containing different pluralities of route parameter values, the pointer is a unique pointer determined by, for example, processing at least some of the plurality of route parameter values with a hash function.

In prior service provider networks, each route reflector and each PE router stores a separate group of route parameter values (e.g., attributes or objects) for each customer (e.g., VPN) route. As noted above, a typical route reflector may need to maintain hundreds of thousands, or even millions, of routes. As such, prior route reflectors (as well as prior PE routers) can consume significant amounts of memory just to store all of these routes. Furthermore, because prior route forwarding techniques require a route's parameters to be included with each route being exchanged, prior route reflectors (as well as prior PE routers) can consume significant amounts of processor cycles just to exchange routes with recipients (e.g., other PE routers, other route reflectors, etc.).

Unlike such prior techniques, the example methods and apparatus described herein recognize that many routes have the same values for at least some of the different parameters (e.g., attributes or objects) describing the routes. Accordingly, the example methods and apparatus utilize a route parameter set (also referred to as an RPS) to represent a specific set of values for a specific set of route parameters, thereby allowing a route to be represented using a route identifier (e.g., a prefix) and one or more pointers to one or more respective route parameter sets representing (e.g., containing) the route parameter values for the route. As such, for each route stored in a route reflector (or PE router), the route reflector (or PE router) can store just a single pointer to a single stored instance of each route parameter set defining the stored route, rather than storing separate sets of route parameter values for each stored route. Additionally, the example methods and apparatus described herein can exchange a route between a PE router and a route reflector (or vice versa) by exchanging just the pointer(s) to the route parameter set(s) defining the route, rather than exchanging all the values for all of the route parameters defining the route. Thus, in at least some examples, the methods and apparatus described herein can reduce the amount of memory used to store routes and/or reduce the amount of processor cycles used to exchange routes with recipients relative to prior route forwarding techniques.

Turning to the figures, a block diagram of an example service provider network 100 in which route parameter sets can be utilized to exchange routes in accordance with the methods and apparatus described herein is illustrated in FIG. 1. The service provider network 100 includes example PE routers 105, 110 and 115 that define the provider side edge of the network 100. Each of PE routers 105, 110 and 115 may be implemented by any type or combination of one or more routers, switches, gateways, computers, etc., and/or one or more processing systems 900 illustrated in FIG. 9 and described in greater detail below.

PE routers 105, 110 and 115 each enable example CPE 120, 125, 130 and 135 associated with (e.g., and possibly located at) one or more customer sites to interface with the service provider network 100. For example, PE router 105 communicatively couples CPE 120 and 125 to the network 100, PE router 110 communicatively couples CPE 130 to the network 100, and PE router 115 communicatively couples CPE 135 to the network 100. Each of the CPE 120, 125, 130 and 135 may be implemented by any type or combination of one or more routers, switches, gateways, computers, etc., and/or one or more processing systems 900 illustrated in FIG. 9 and described in greater detail below.

In the illustrated example, PE routers 105, 110 and 115 implement a first VPN (VPN 1) to interconnect CPE 120 and 130. PE routers 105, 110 and 115 also implement a second VPN (VPN 2) to interconnect CPE 125 and 135. To implement these VPNs, PE routers 105, 110 and 115 exchange routes defining the VPNs via an example route reflector 140 included in the service provider network 100. In particular, PE routers 105, 110 and 115 and the route reflector 140 employ the example method and/or apparatus described herein to utilize route parameter sets to exchange routes in the network 100. The route reflector 140 may be implemented by any type or combination of one or more routers, switches, gateways, computers, etc., and/or one or more processing systems 800 illustrated in FIG. 8 and described in greater detail below.

For example, PE router 105 receives one or more routes for VPN 1 from CPE 120, and receives one or more routes for VPN 2 from CPE 125. Each route received from PE 120 and CPE 125 includes a route identifier identifying the route and a collection of route parameters (e.g., route objects, attributes, etc.) characterizing the route. PE router 105 forwards (or sends) the routes received from CPE 120 and 125 to the route reflector 140 via one or more route update messages 145. In some examples, the route update message(s) 145 are implemented as one or more BGP UPDATE messages. However, instead of including the entire collection of route parameter values for each route, PE router 105 includes one or more pointers to one or more respective route parameter sets in the route update message(s) 145 used to forward at least some of the routes. Because different routes can have similar, or even identical, route parameter values (e.g., values of route objects, attributes, etc.), forwarding pointers to route parameter sets representing (e.g., containing) known sets of route parameter values, instead of forwarding separates collections of route parameter values for each of the routes, can potentially provide significant savings in the storage, processor cycles and/or communication bandwidth used to exchange routes in the network 100.

In the illustrated example, the route reflector 140 stores the routes received via the route update message(s) 145. Instead of storing a separate collection of route parameter values for each route, the route reflector 140 stores, for each route, the pointer(s) to the route parameter set(s) containing the set of route parameter values characterizing the route. As mentioned above, multiple routes can share the same route parameter set. The route reflector 140 then forwards the routes for VPN 1 to PE router 110 via one or more route update messages 150 (e.g., which may be implemented as one or more BGP UPDATE messages). The route reflector 140 also forwards the routes for VPN 2 to PE router 115 via one or more route update messages 155 (e.g., which may be implemented as one or more BGP UPDATE messages). Similar to PE router 105, the route reflector 140 employs the example methods and/or apparatus described herein to include one or more pointers to one or more respective route parameter sets, instead of entire collections of route parameter values, in the route update message(s) 150 and 155 used to forward at least some of the routes to the respective PEs 110 and 115.

In a similar manner, PE router 110 receives one or more routes for VPN 1 from CPE 130, and forwards the received route(s) to the route reflector 140 via one or more route update messages 160 (e.g., implemented as one or more BGP UPDATE messages) including pointer(s) to route parameter set(s) for at least some of the one or more forwarded routes. Similarly, PE router 115 receives one or more routes for VPN 2 from CPE 135, and forwards the received route(s) to the route reflector 140 via one or more route update messages 165 (e.g., implemented as one or more BGP UPDATE messages) including pointer(s) to route parameter set(s) for at least some of the one or more forwarded routes. The route reflector 140, in turn, forwards these routes for VPN 1 and VPN 2 to PE router 105 via one or more route update messages 170 (e.g., implemented as one or more BGP UPDATE messages) including pointer(s) to route parameter set(s) for at least some of the one or more forwarded routes.

Although the service provider network 100 of the illustrated example includes three PE routers, one route reflector and four CPE, the methods and apparatus described herein can be used in networks having any numbers of PE routers, route reflectors and CPE. Additionally, in some examples, PE routers 105-115 interface with a second route reflector (not shown) in addition to the route reflector 140. For example, such a second route reflector could be used to configure one or more "brick walls" by associating each route reflector with a different routing plane and then restricting the forwarding of routes from one or more of PE routers 105-115 to only one of these routing planes. For example, PE router 105 could be configured to listen for routes on a first routing plane associated with the route reflector 140 and a second routing plane associated with the second route reflector (not shown), but to advertise (e.g., forward) received routes on only the first routing plane associated with the route reflector 140. Other brick walls could be configured for PE routers 110 and/or 115.

As described above, the route update messages 145-170 can be implemented as BGP UPDATE messages. In such examples, each route being exchanged corresponds to a BGP route in which the route identifier corresponds to a route prefix (e.g., which can be an address and an associated mask)

representing a collection of destination IP addresses supported by the route, and the route parameters correspond to BGP route objects. Examples of BGP route objects include, but are not limited to, a BGP next hop (e.g., identifying the router that is the next hop towards the destination(s) represented by the route prefix), a path (e.g., AS_PATH) attribute (e.g., identifying the autonomous system(s) through which the routing information included in the UPDATE message has passed), a MULTI-EXIT-DISCRIMINATOR (MED) attribute (e.g., to discriminate among multiple access points to a neighboring autonomous system), a LOCAL_PREF (or LocPrf) attribute (e.g., representing a local preference for the advertised route), a metric (e.g., representing a cost associated with the route to be used for traffic engineering), a weight (e.g., a vendor-specific parameter associated with the route), etc. In such examples, a route parameter set includes values for one or more of these route objects. Thus, the route objects for a particular route can be identified by a pointer (or pointers) to the route parameter set (or route parameter sets) containing the route object values characterizing the particular route.

Furthermore, although at least some of the preceding examples of utilizing route parameter sets to exchange routes in the service provider network 100 have been described in the context of implementation via the BGP protocol, the example methods, apparatus and articles of manufacture described herein are not limited thereto. For example, the methods, apparatus and articles of manufacture described herein can be used to exchange routing information (e.g., attributes, parameters, etc.) in the context of other types of communication protocols, such as, but not limited to, the open shortest path first (OSPF) protocol, the intermediate system to intermediate system (IS-IS) protocol, the enhanced interior gateway routing protocol (EIGRP), etc.

Figure 2:
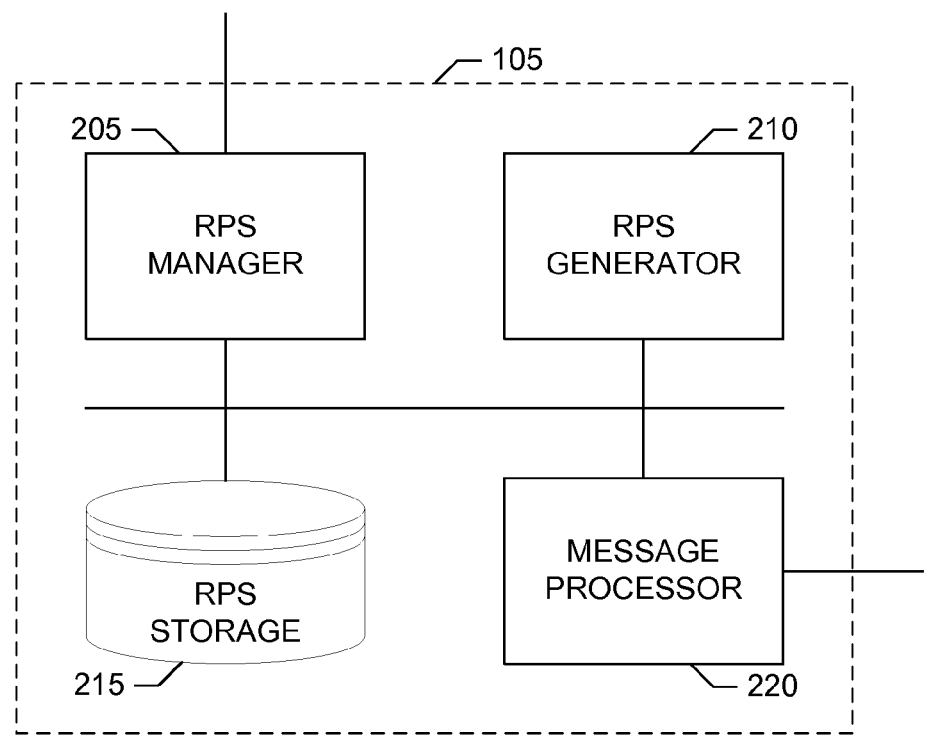
FIG. 2 is a block diagram of an example PE router than can be used to implement the service provider network of FIG. 1.

A block diagram of an example implementation of one or more of PE routers 105-115 of FIG. 1 is illustrated in FIG. 2. For brevity, FIG. 2 is described from the perspective of implementing PE router 105, but the illustrated example of FIG. 2 could additionally or alternatively be used to implement PE routers 110 and/or 115. Also, FIG. 2 illustrates portions of PE router 105 associated with the example methods and apparatus described herein. Those portions of PE router 105 associated with other functionality are omitted for clarity.

The PE router 105 of FIG. 2 includes an example router parameter set (RPS) manager 205 to receive a route from CPE in communication with PE router 200. The RPS manager 205 then determines whether a route parameter set containing route parameter values matching the route parameter values for the received route exists and has already been sent to the route reflector 140. For example, the RPS manager 205 can determine that such a route parameter set has already been sent to the route reflector 140 if PE router 105 itself previously sent this route parameter set to the route reflector 140, or if PE router 105 previously received this route parameter set from the route reflector 140 (e.g., thereby indicating that the route parameter set was received by the route reflector 140 from another PE router, such as PE router 110 or 115).

If a route parameter set containing route parameter values matching the route parameter values for the received route has not already been sent to the route reflector 140, the RPS manager 205 router invokes an example RPS generator 210 included in PE router 105 to create a new route parameter set containing one or more of the route parameter values for the received route (e.g., if this route parameter set does not already exist at PE router 105). The RPS generator 210 also generates a pointer to represent (e.g., to identify or point to) the created route parameter set. In some examples, the RPS generator 210 generates a unique pointer for the created route parameter set by processing one or more of the route parameter values contained in the route parameter set with a hash or similar function. The RPS generator 210 then stores the created route parameter set and associated pointer in an example RPS storage 215. The RPS storage 215 may be implemented using any type of memory or storage, such as the volatile memory 918 and/or the mass storage device 930 of FIG. 9, which is described in greater detail below.

After creating the new route parameter set and associated pointer, an example message processor 220 included in PE router 105 is used to forward the received route to the route reflector 140 by sending a route identifier, the route parameter set and the pointer. The message processor 220 also stores (or updates) an indication (e.g., flag, data value, etc.) in the RPS storage 215 to record that this route parameter set has been sent to the route reflector 140. In an example BGP implementation, the message processor 220 can send a BGP UPDATE message containing the route prefix as the route identifier for the route and one or more new message attributes representing the route parameter set and the pointer. Additionally or alternatively, one or more new messages may be defined and used by the message processor 220 for sending one or more of the route parameter set or the pointer to the route reflector 140.

However, if the RPS manager 205 determines that the route parameter set containing route parameter values matching the route parameter values for the received route has already been sent to the route reflector 140, the RPS manager 205 retrieves or otherwise determines the pointer for this route parameter set and causes the message processor 220 to forward the route to the route reflector 140 by sending the route identifier and just the pointer to the route parameter set. As described above, in an example BGP implementation, the message processor 220 can send a BGP UPDATE message containing the route prefix for the route and a new UPDATE message attributes representing the pointer. Additionally or alternatively, a new message may be defined and used by the message processor 220 for sending the pointer to the route reflector 140.

As noted above, in some examples, pointers to route parameter sets are generated by processing one or more of the route parameter values included in the route parameter set with a hash function. Such as procedure generates a unique pointer for each route parameter set. In some examples in which hashing (or similar processing) is used to generate unique pointers to the route parameter sets, the RPS manager 205 can also determine whether a particular route parameter set has already been sent to the route reflector 140 by sending a query to the route reflector 140 containing a pointer generated by processing the appropriate route parameter values included in the route parameter set with a hash function. The route reflector 140 can then reply to the query with a result indicating whether the route reflector 140 already has a matching pointer and, thus, already has the associated route parameter set.

Figure 3:
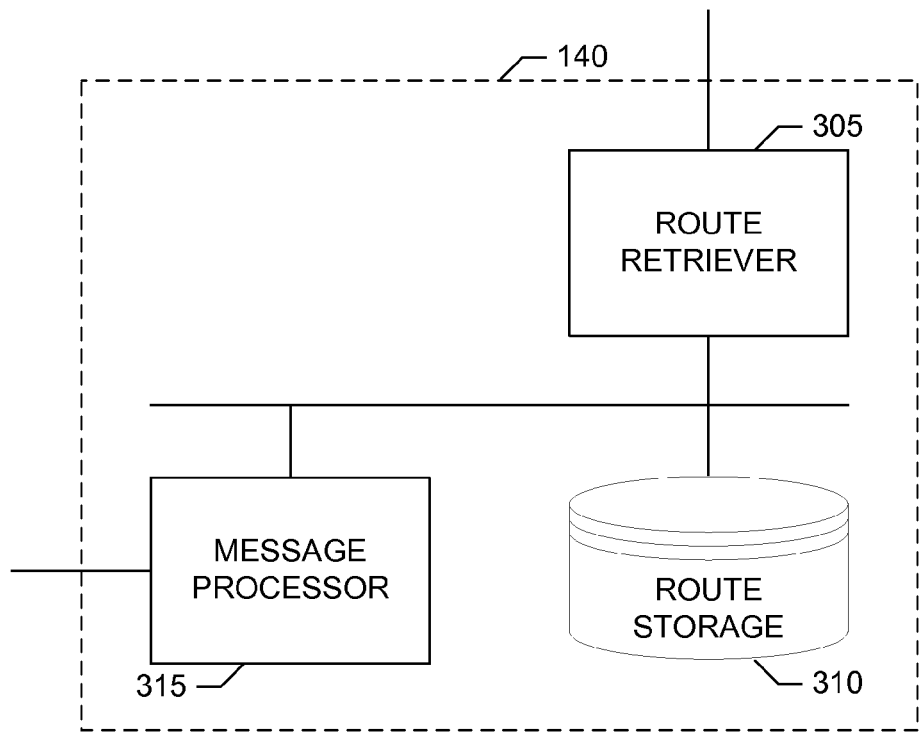
FIG. 3 is a block diagram of an example route reflector that can be used to implement the service provider network of FIG. 1.

A block diagram of an example implementation of the route reflector 140 of FIG. 1 is illustrated in FIG. 3. In particular, FIG. 3 illustrates portions of the route reflector 140 associated with the example methods and apparatus described herein. Those portions of the route reflector 140 associated with other functionality are omitted for clarity.

The route reflector 140 of FIG. 3 includes an example route retriever 305 to retrieve a route to be forwarded to a PE router, such as PE router 105. In the illustrated example, the route retriever 305 retrieves the route from an example route storage 310. The route storage 310 may be implemented using any type of memory or storage, such as the volatile memory 918 and/or the mass storage device 930 of FIG. 9, which is described in greater detail below. The route storage 310 stores one or more route parameter set(s) for use in accordance with the example methods and apparatus described herein. The route storage 310 also stores route identifiers (e.g., route prefixes) and route parameter set pointers for each of the routes managed by the route reflector 140.

When the route reflector 140 is to forward a route to a PE router, the route retriever 305 determines whether a route parameter set containing route parameter values matching the route parameter values for the route to be forwarded has already been sent to the PE router. For example, the route retriever 305 can determine that this route parameter set has already been sent to the PE router if the route reflector 140 previously sent the route parameter set to the PE router, or if the route reflector 140 previously received the RPS from this same PE router (e.g., thereby indicating that this PE router previously generated the route parameter set itself and provided it to the route reflector 140).

If a route parameter set containing route parameter values matching the route parameter values for the route to be forwarded has not already been sent to the PE router, the route retriever 305 causes an example message processor 315 included in the route reflector 140 to send a route identifier, the route parameter set and a pointer to the route parameter set to forward the route to the PE router. The message processor 315 also stores (or updates) an indication in the route storage 310 to record that this route parameter set has been sent to this particular PE router. In an example BGP implementation, the message processor 315 can send a BGP UPDATE message containing the route prefix for the route and one or more new UPDATE message attributes representing the route parameter set and the pointer. Additionally or alternatively, one or more new messages may be defined and used by the message processor 315 for sending one or more of the route parameter set or the pointer to the PE router.

However, if the route retriever 305 determines that the route parameter set containing route parameter values matching the route parameter values for the route to be forwarded has already been sent to the PE router, the route retriever 305 causes the message processor 315 to forward the route to the PE router by sending the route identifier and just the pointer to the route parameter set containing the route parameter values for the route being forwarded. As described above, in an example BGP implementation, the message processor 315 can send a BGP UPDATE message containing the route prefix for the route and a new UPDATE message attributes representing the pointer. Additionally or alternatively, a new message may be defined and used by the message processor 315 for sending the pointer to the PE router.

While example manners of implementing PE router 105 and router reflector of FIG. 1 have been illustrated in FIGS. 2-3, one or more of the elements, processes and/or devices illustrated in FIG. 2-3 may be combined, divided, re-arranged, omitted, eliminated and/or implemented in any other way. Further, the example RPS manager 205, the example RPS generator 210, the example RPS storage 215, the example message processor 220, the example route retriever 305, the example route storage 310, the example message processor 315 and/or, more generally, the example PE router 105 and/or the example route reflector 140 of FIGS. 2-3 may be implemented by hardware, software, firmware and/or any combination of hardware, software and/or firmware. Thus, for example, any of the example RPS manager 205, the example RPS generator 210, the example RPS storage 215, the example message processor 220, the example route retriever 305, the example route storage 310, the example message processor 315 and/or, more generally, the example PE router 105 and/or the example route reflector 140 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example PE router 105, the example route reflector 140, the example RPS manager 205, the example RPS generator 210, the example RPS storage 215, the example message processor 220, the example route retriever 305, the example route storage 310 and/or the example message processor 315 are hereby expressly defined to include a tangible computer readable medium such as a memory, digital versatile disk (DVD), compact disk (CD), etc., storing such software and/or firmware. Further still, the example PE router 105 and/or the example route reflector 140 of FIGS. 2-3 may include one or more elements, processes and/or devices in addition to, or instead of, those illustrated in FIGS. 2-3, and/or may include more than one of any or all of the illustrated elements, processes and devices.

Figure 4:
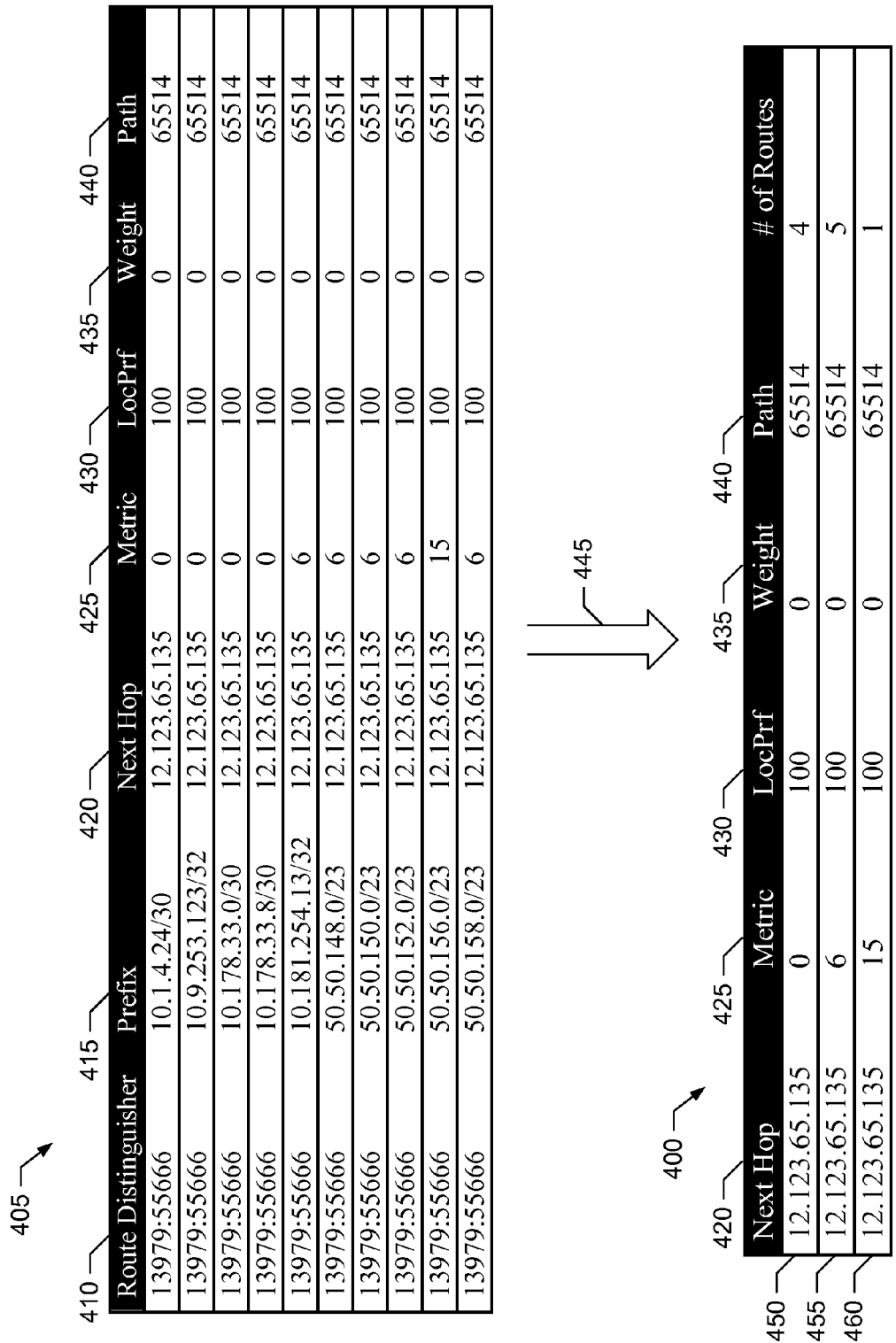
FIG. 4 illustrates an example operation of the PE router of FIG. 2 to determine a router parameter set for exchanging routes in the service provider network of FIG. 1.

Example operation of PE router 105 of FIG. 2 to create route parameter sets 400 for a group of routes 405 is illustrated in FIG. 4. In the illustrated example, PE router 105 is to forward ten (10) routes 400 to the route reflector 140. The routes 400 all correspond to a single VPN represented by a route distinguisher 410 and a next hop 420. Each route 400 corresponds to a BGP route 400 having a route prefix 415 and a collection of route objects (e.g., parameters) 420-440. The collection of objects include a BGP next hop 420, a metric 425, a local preference (LocPrf) attribute 430, a weight 435 and a path attribute 440.

In the illustrated example, PE router 105 processes the routes 400 (represented by a directed arrow 445) to determine the group of route parameter sets 400 having route object (e.g., parameter) values that match the route object (e.g., parameter) values for the routes 405. In the illustrated example, each of the route parameter sets 400 includes values for the BGP next hop 420, the metric 425, the local preference (LocPrf) attribute 430, the weight 435 and the path attribute 440, which are the objects characterizing the routes 400. For example, a first route parameter set 450 has a next hop 420 equal to 12.123.65.135, a metric 425 equal to 0, a local preference 430 equal to 100, a weight 435 equal to 0, and a path equal to 65514. A second route parameter set 455 has a next hop 420 equal to 12.123.65.135, a metric 425 equal to 6, a local preference 430 equal to 100, a weight 435 equal to 0, and a path equal to 65514. A third route parameter set 460 has a next hop 420 equal to 12.123.65.135, a metric 425 equal to 15, a local preference 430 equal to 100, a weight 435 equal to 0, and a path equal to 65514. As noted in FIG. 4, the first route parameter set 450 is common to four (4) of the routes 405, the second route parameter set 455 is common to five (5) of the routes 405, and the third route parameter set 460 is common to one (1) of the routes 405.

Figure 5:
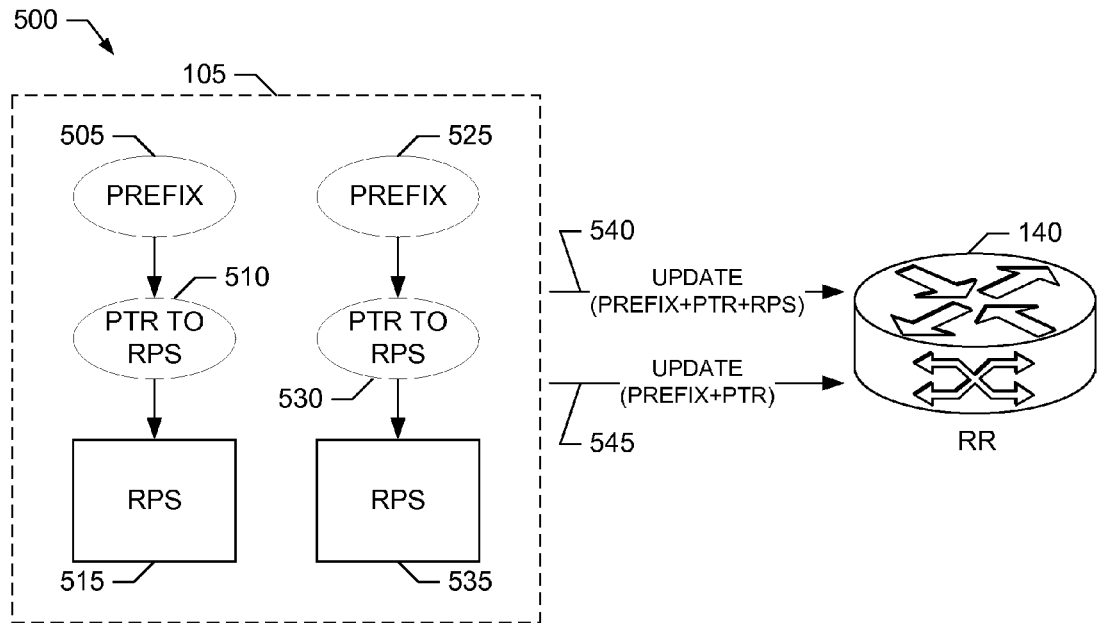
FIG. 5 illustrates an example operation in which an example PE router utilizes a route parameter set to exchange routes with an example route reflector.

An example operation 500 of PE router 105 of FIGS. 1 and/or 2 to forward (e.g., exchange) routes to the route reflector 140 of FIGS. 1 and/or 3 is illustrated in FIG. 5. In the example operation 500, PE router 105 is to forward two routes to route reflector 140. The first route includes a first prefix (e.g., identifier) 505 and a first pointer 510 to a first route parameter set 515. The first route parameter set 515 contains a first set of route parameter values matching the route parameter values of the first route. The second route includes a second prefix (e.g., identifier) 525 and a second pointer 530 to a second route parameter set 535. The second route parameter set 515 contains a second set of route parameter values matching the route parameter values of the second route.

In the illustrated example, the first route parameter set 515 has not yet been sent to the route reflector 140, but the second route parameter set 535 has already been sent to the route reflector 140. Thus, PE router 105 forwards the first route to the route reflector 140 using a first update message 540 conveying the first prefix 505, the first pointer 510 and the first route parameter set 515. For example, the first update message 540 can correspond to one or more BGP UPDATE messages containing the first route prefix 505 and one or more new message attributes representing the first pointer 510 and the first route parameter set 515. However, because the second parameter set 535 has already been sent to the route reflector 140, PE router 105 can forward the second route by using a second update message 545 conveying the second prefix 525 and the second pointer 530, but not the second route parameter set 535 (thereby resulting in potential memory, bandwidth and/or processor savings). For example, the second update message 545 can correspond to one or more BGP UPDATE messages containing the second route prefix 525 and a new message attribute representing the second pointer 530.

Figure 6:
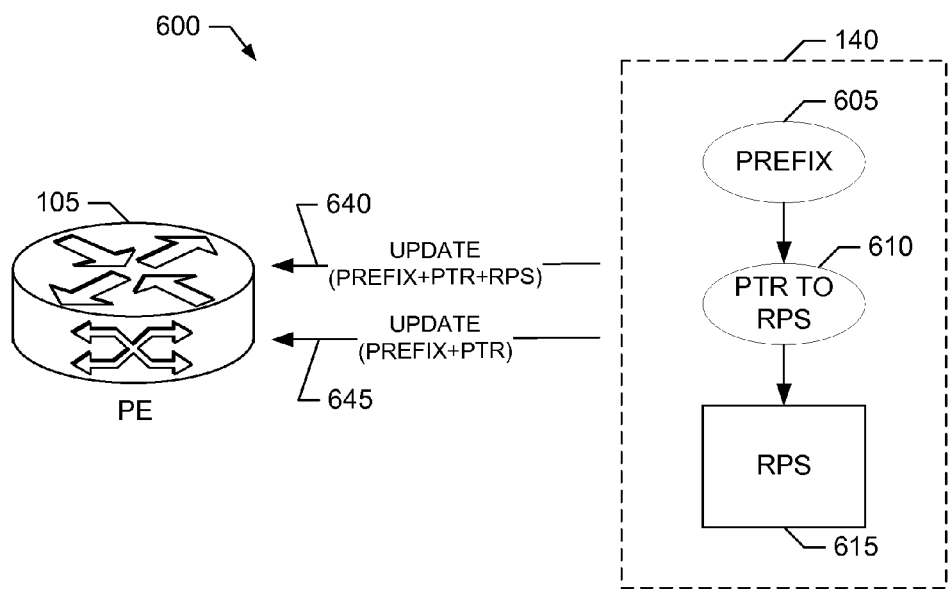
FIG. 6 illustrates an example operation in which an example route reflector utilizes a route parameter set to exchange a route with an example PE router.

An example operation 600 of the route reflector 140 of FIGS. 1 and/or 3 to exchange (e.g., forward) routes to PE router 105 of FIGS. 1 and/or 2 is illustrated in FIG. 6. In the example operation 600, the route reflector 140 is to forward a route to PE router 105. The route includes a prefix (e.g., identifier) 605 and a pointer 610 to a route parameter set 615. The route parameter set 615 contains a set of route parameter values matching the route parameter values of the route to be forwarded to PE router 105.

If the route parameter set 615 has not yet been sent to PE router 105, the route reflector 140 forwards the route to PE router 105 using a first update message 640 conveying the prefix 605, the pointer 610 and the route parameter set 615. For example, the first update message 640 can correspond to one or more BGP UPDATE messages containing the route prefix 605 and one or more new message attributes representing the pointer 610 and the route parameter set 615. However, if the parameter set 615 has already been sent to PE router 105, the route reflector 140 can forward the route by using a second update message 645 conveying the prefix 605 and the pointer 610, but not the route parameter set 615 (thereby resulting in potential memory, bandwidth and/or processor savings). For example, the second update message 645 can correspond to one or more BGP UPDATE messages containing the route prefix 605 and a new message attribute representing the pointer 610.

Figure 7:
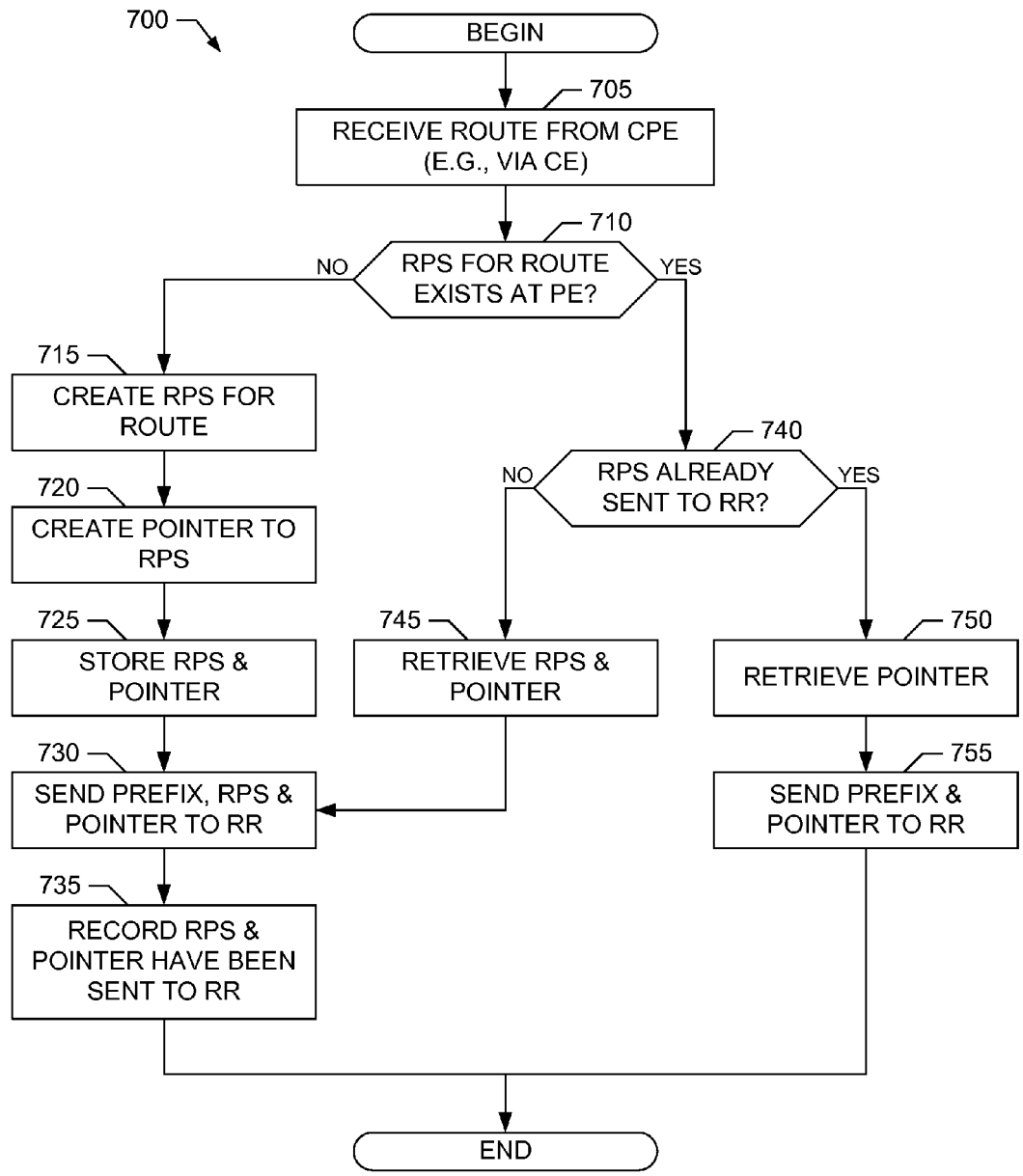
FIG. 7 is a flowchart representative of example machine readable instructions that may be executed to implement the PE router of FIG. 2.
Figure 8:
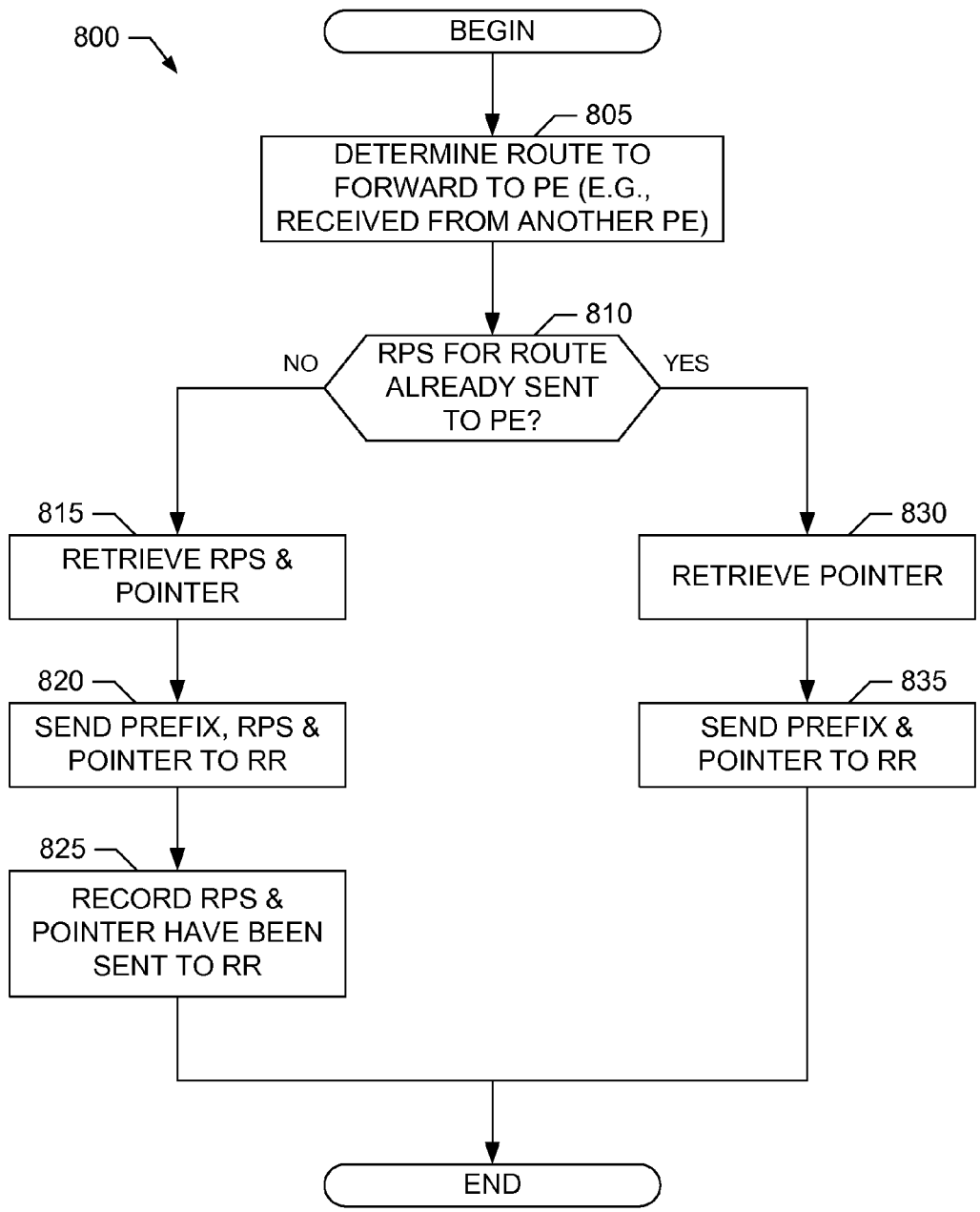
FIG. 8 is a flowchart representative of example machine readable instructions that may be executed to implement the route reflector of FIG. 3.

Flowcharts representative of example machine readable instructions that may be executed to implement the example PE routers 105, 110 and/or 115, the example route reflector 140, the example RPS manager 205, the example RPS generator 210, the example RPS storage 215, the example message processor 220, the example route retriever 305, the example route storage 310 and/or the example message processor 315 are shown in FIGS. 7-8. In these examples, the machine readable instructions represented by each flowchart may comprise one or more programs for execution by a processor, such as the processor 912 shown in the example processing system 900 discussed below in connection with FIG. 9. Alternatively, the entire program or programs and/or portions thereof implementing one or more of the processes represented by the flowcharts of FIGS. 7-8 could be executed by a device other than the processor 912 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-8 may be implemented manually. Further, although the example machine readable instructions are described with reference to the flowcharts illustrated in FIGS. 7-8, many other techniques for implementing the example methods and apparatus described herein may alternatively be used. For example, with reference to the flowcharts illustrated in FIGS. 7-8, the order of execution of the blocks may be changed, and/or some of the blocks described may be changed, eliminated, combined and/or subdivided into multiple blocks.

As mentioned above, the example processes of FIGS. 7-8 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-8 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Example machine readable instructions 700 that may be executed to implement PE routers 105, 110 and/or 115 are represented by the flowchart shown in FIG. 7. For convenience, and without loss of generality, the example machine readable instructions 700 are described from the perspective of execution in or by PE router 105. The example machine readable instructions 700 may be executed at predetermined intervals, based on an occurrence of a predetermined event, etc., or any combination thereof. With reference to the preceding figures, the machine readable instructions 700 begin execution at block 705 of FIG. 7 at which PE router 105 receives one or more routes from one or more CPE 120-125 in communication with PE router 105 (e.g., possibly via one or more customer edge (CE) routers interconnecting the CPE 120-125 with PE router 105).

Next, at block 710 the RPS manager 205 included in PE router 105 obtains a received route to be forwarded to the route reflector 140 and determines whether a route parameter set for the route already exists in the RPS storage 215. For example, at block 710 the RPS manager 205 can determine whether the route parameter values of the obtained route match the route parameter values of any route parameter set in a group of route parameter sets stored in the RPS storage 215. Additionally or alternatively, the RPS manager 205 can generate a unique pointer by processing one or more of the route parameter values of the obtained route with a hash (or similar) function. The RPS manager 205 can then compare the generated pointer with a group of similarly generated, stored unique pointers associated with the group of route parameter sets stored in the RPS storage 215 to determine whether there is a match. Because the pointers are unique, if the generate pointer matches one of the stored pointers, the route parameter set associated with the matching pointer is known to match the route parameter values for the obtained route.

If, using any of the preceding techniques or any other technique, the RPS manager 205 determines that a route parameter set for the obtained route does not exist (block 710), then at block 715 the RPS generator 210 included in PE router 105 creates a new route parameter set containing route parameter values for the obtained route. At block 720, the RPS generator 210 creates, as described above, a pointer to represent (e.g., to identify or point to) the new route parameter set created at block 715. At block 725, the RPS generator 210 stores the newly created route parameter set and associated pointer in the RPS storage 215. At block 730, the message processor 220 included in PE router 105 is used to send one or more route update messages (e.g., one or more suitably modified BGP UPDATE messages and/or other messages as described above) conveying the route identifier (e.g., route prefix) for the obtained route, the route parameter set created at block 715 and the pointer created at block 720 to forward the received route to the route reflector 140. At block 735, the message processor 220 stores, in the RPS storage 215, an indication (e.g., flag, data value, etc.) associated with or otherwise identifying the route parameter set created at block 720 and the route reflector 140 to record that this route parameter set has been sent to the route reflector 140. Execution of the example machine readable instructions 700 then ends.

However, if the RPS manager 205 determines that a route parameter set for the obtained route does exist (block 710), then at block 740 the RPS generator 210 determines whether this route parameter set has already been sent to the route reflector 140. For example, the RPS manager 205 can check for an appropriate indication stored in the RPS storage 215 and associated with or otherwise identifying this route parameter set and the router reflector 140 and determines whether this indication is set to a value indicating that this route parameter set has or has not been sent to the route reflector 140. If the RPS manager 205 determines that the route parameter set has not been sent to the route reflector 140 (block 740), then the route parameter set exists but has not been forwarded (e.g., which can occur when the route parameter set was received from another route reflector on a first routing plane, and is to now be forwarded to the route reflector 140 on a second routing plane). Accordingly, at block 745 the RPS manager 205 retrieves this route parameter set and its associated pointer from the RPS storage 215. Processing then continues to block 730 and subsequent blocks, which are described above.

However, if the RPS manager 205 determines that the route parameter set for the obtained route has already been sent (e.g., as part of previously forwarding another route) to the route reflector 140 (block 740), then at block 750 the RPS manager 205 retrieves the pointer associated with this route parameter set from the RPS storage 215. Alternatively, the RPS manager 205 can generate the pointer by processing the appropriate route parameter value(s) with the hash or other function being used for pointer generation. At block 755, the message processor 220 is used to send one or more route update messages (e.g., one or more suitably modified BGP UPDATE messages and/or other messages as described above) conveying the route identifier (e.g., route prefix) for the obtained route and the pointer retrieved or determined at block 750, but not conveying the associated route parameter set, to forward the received route to the route reflector 140. Execution of the example machine readable instructions 700 then ends.

Example machine readable instructions 800 that may be executed to implement the route reflector 140 are represented by the flowchart shown in FIG. 8. The example machine readable instructions 800 may be executed at predetermined intervals, based on an occurrence of a predetermined event, etc., or any combination thereof. With reference to the preceding figures, the machine readable instructions 800 begin execution at block 805 of FIG. 8 at which the route retriever 305 included in the route reflector 140 obtains a route to be forwarded to PE router 105. For example, the route retriever 305 can retrieve a route previously received from another PE router and stored in the route storage 310 included in the route reflector 140. Then, at block 810 the route retriever 305 determines whether a route parameter set for the route obtained at block 805 has already been sent to PE router 105. For example, the route retriever 305 can use any of techniques described above, or another technique, to determine which one of a group of route parameter sets stored in the route storage 310 matches the route parameter values of the obtained route. Once the matching route parameter set is identified, the route retriever 305 then checks for an appropriate indication stored in the route storage 310 and associated with or otherwise identifying this route parameter set and PE router 105 and determines whether this indication is set to a value indicating that this route parameter set has or has not been sent to PE router 105.

If the route parameter set for the route obtained at block 805 has not been sent to PE router 105 (block 810), then at block 815 the route retriever 305 retrieves this route parameter set and its associated pointer from the route storage 310. At block 820, the message processor 315 included in route reflector 140 is used to forward the received route to PE router 105 by sending one or more route update messages (e.g., one or more suitably modified BGP UPDATE messages and/or other messages as described above) conveying the route identifier (e.g., route prefix) for the route obtained at block 805, the route parameter set retrieved at block 815 and the pointer retrieved at block 815. At block 825, the message processor 315 stores, in the route storage 310, an indication (e.g., flag, data value, etc.) associated with or otherwise identifying the route parameter set retrieved at block 815 and PE router 105 to record that this route parameter set has been sent to the route reflector 140. Execution of the example machine readable instructions 800 then ends.

However, if the route retriever 305 determines that the route parameter set for the obtained route has already been sent (e.g., as part of previously forwarding another route) to PE router 105 (block 810), then at block 830 the route retriever 305 retrieves the pointer associated with this route parameter set from the route storage 310. Alternatively, the route retriever 305 can generate the pointer by processing the appropriate route parameter value(s) with the hash or other function being used for pointer generation. At block 835, the message processor 315 is used to forward the received route to PE router 105 by sending one or more route update messages (e.g., one or more suitably modified BGP UPDATE messages and/or other messages as described above) conveying the route identifier (e.g., route prefix) for the route obtained at block 805 and the pointer retrieved at block 830, but not conveying the associated route parameter set. Execution of the example machine readable instructions 800 then ends.

In some examples, one or more of the example methods and/or apparatus disclosed herein can be combined with one or more of the example methods and/or apparatus disclosed in U.S. patent application Ser. No. 12/907,295, which also corresponds to U.S. Patent Publication No. 2012/0093166) to Rosenberg, et al., entitled "Methods and Apparatus to Utilize Route Aggregation for Exchanging Routes in a Communication Network," and filed on the same date as the instant application, which is hereby incorporated by reference in its entirety. In such examples, one or more of the example methods and/or apparatus disclosed in U.S. patent application Ser. No. 12/907,295, which also corresponds to U.S. Patent Publication No. 2012/0093166) can be used to aggregate multiple individual routes (e.g., having different individual route identifiers/prefixes, but similar route parameter values) into an aggregate route characterized by a single, aggregate route identifier (e.g., aggregate route prefix) and a single collection of aggregate route parameter values. The aggregate route can be further characterized by an absentee list specifying one or more route identifiers for a respective one or more individual routes not to be included in the aggregate route, and/or an exception matrix specifying one or more individual route identifiers for a respective one or more individual routes having one or more individual route parameter values not included in (e.g., different from) the plurality of aggregate route parameter values. One or more of the example method and/or apparatus disclosed herein can then be used to send (e.g., forward) the aggregate route (e.g., including the collection of aggregate route parameter values, the absentee list and/or the exception matrix) to a recipient using route parameter set(s) and associated pointer(s), as described herein.

Figure 9:
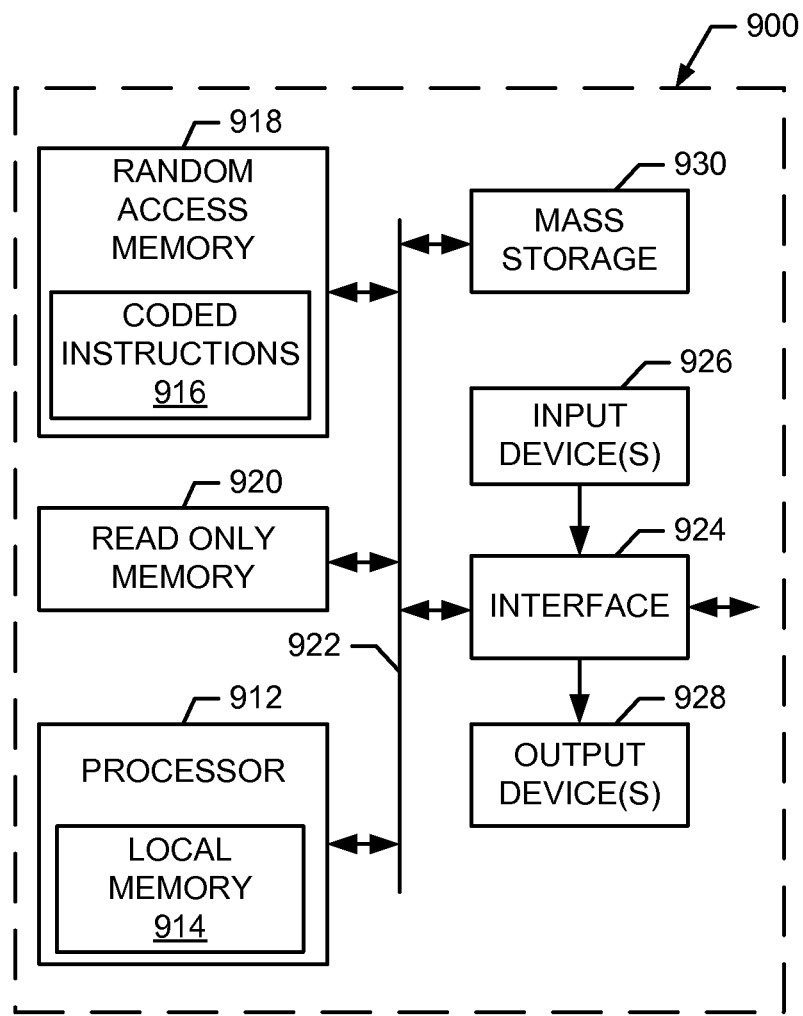
FIG. 9 is a block diagram of an example processing system that may execute the example machine readable instructions of FIGS. 7 and/or 8 to implement the PE router of FIG. 2, the route reflector of FIG. 3 and/or the service provider network of FIG. 1.

FIG. 9 is a block diagram of an example processing system 900 capable of implementing the apparatus and methods disclosed herein. The processing system 900 can be, for example, a server, a personal computer, a personal digital assistant (PDA), an Internet appliance, a DVD player, a CD player, a digital video recorder, a personal video recorder, a set top box, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 7-8. The processor 912 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The processing system 900 also includes an interface circuit 924. The interface circuit 924 may be implemented by any type of interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a cathode ray tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 900 also includes one or more mass storage devices 930 for storing software and data. Examples of such mass storage devices 930 include floppy disk drives, hard drive disks, compact disk drives and digital versatile disk (DVD) drives. The mass storage device 930 may implement the audio metric registers 616-620, the video metric registers 624-628 and/or the metadata metric registers 632-636. Alternatively, the volatile memory 918 may implement the audio metric registers 616-620, the video metric registers 624-628 and/or the metadata metric registers 632-636.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to exchange routes in a communication network, the method comprising:

receiving, using a processor, first routing information describing a first route, the first routing information comprising a route identifier identifying the first route and a first plurality of route parameter values characterizing the first route;

associating the first plurality of route parameter values of the first route with a first route parameter set that is to include the first plurality of route parameter values; and in response to determining that the same first route parameter set was already sent to a recipient in the communication network when a description of a second route different from the first route was previously forwarded to the recipient, forwarding a description of the first route to the recipient by sending, using the processor, a border gateway protocol update message to the recipient, the border gateway protocol update message being modified to include both the route identifier and a pointer, and to not include the first route parameter set which has the first plurality of route parameter values, wherein the pointer corresponds to the first route parameter set and is determined by processing at least one of the first plurality of route parameter values with a hash function.

2. The method of claim 1, further comprising:

if the first route parameter set has not already been forwarded to the recipient, sending the route identifier, the pointer and the first plurality of route parameter values included in the first route parameter set to forward the description of the first route to the recipient.

3. The method of claim 2, further comprising, when the first plurality of route parameter values included in the first route parameter set is sent to the recipient, recording that the first route parameter set has been sent to the recipient.

4. The method of claim 1, further comprising:

determining whether the first route parameter set exists in a memory;

if the first route parameter set does not exist:
creating the first route parameter set;
creating the pointer;
associating the pointer with the first route parameter set; and
storing the first route parameter set and the pointer in the memory; and if the first route parameter set does exist, retrieving the pointer from the memory.

5. The method of claim 4, further comprising comparing the first plurality of route parameter values with contents of a plurality of stored route parameter sets to determine whether the first route parameter set exists in the memory.

6. The method of claim 1, wherein the route identifier comprises a route prefix, and the first route is associated with a virtual private network.

7. The method of claim 1, wherein the border gateway protocol update message includes an attribute to convey the pointer.

8. The method of claim 1, wherein the recipient is at least one of a provider edge router or a route reflector.

9. A tangible machine readable medium comprising machine readable instructions which, when executed, cause a machine to perform operations comprising:

associating a first plurality of route parameter values characterizing a first route with a first route parameter set that is to include the first plurality of route parameter values;

determining whether the same first route parameter set was previously sent to a recipient in a communication network when a description of a second route different from the first route was previously forwarded to the recipient; and forwarding a description of the first route to the recipient by sending a border gateway protocol update message modified to include both a route identifier of the route and a pointer, and to not include the first route parameter set which has the first plurality of route parameter values, to the recipient in response to determining that the same first route parameter set was previously forwarded to the recipient, wherein the pointer corresponds to the first route parameter set and is determined by processing at least one of the first plurality of route parameter values with a hash function.

10. The tangible machine readable medium of claim 9, wherein the operations further comprise:

if the first route parameter set has not already been forwarded to the recipient, sending the route identifier, the pointer and the first plurality of route parameter values included in the first route parameter set to forward the description of the first route to the recipient.

11. The tangible machine readable medium of claim 10, wherein the operations further comprise recording that the first route parameter set has been sent to the recipient when the first plurality of route parameter values included in the first route parameter set is sent to the recipient.

12. The tangible machine readable medium of claim 9, wherein the operations further comprise:

determining whether the first route parameter set exists in a memory;

if the first route parameter set does not exist:
creating the first route parameter set;
creating the pointer;
associating the pointer with the first route parameter set; and
storing the first route parameter set and the pointer in the memory; and if the first route parameter set does exist, retrieving the pointer from the memory.

13. The tangible machine readable medium of claim 12, wherein the operations further comprise comparing the first plurality of route parameter values with contents of a plurality of stored route parameter sets to determine whether the first route parameter set exists in the memory.

14. An apparatus comprising:

a processor to execute instructions to perform operations comprising:

associating a first plurality of route parameter values characterizing a first route with a first route parameter set that is to include the first plurality of route parameter values;

determining whether the same first route parameter set was previously sent to a recipient in a communication network when a description of a second route different from the first route was previously forwarded to the recipient; and forwarding a description of the first route to the recipient by sending a border gateway protocol update message modified to include both a route identifier of the route and a pointer, and to not include the first route parameter set which has the first plurality of route parameter values, to the recipient in response to determining that the same first route parameter set was previously forwarded to the recipient, wherein the pointer corresponds to the first route parameter set and is determined by processing at least one of the first plurality of route parameter values with a hash function; and a memory to store the instructions, the first route parameter set and the pointer.

15. The apparatus of claim 14, wherein the operations further comprise:

sending the route identifier, the pointer and the first plurality of route parameter values included in the first route parameter set to forward the first route to the recipient if the processor determines that the first route parameter set has not already been forwarded to the recipient.

16. The apparatus of claim 15, wherein the operations further comprise, when the first plurality of route parameter values included in the first route parameter set is sent to the recipient, recording in the memory that the first route parameter set has been sent to the recipient.

17. The apparatus of claim 14, wherein the operations further comprise:

determining whether the first route parameter set is already stored in the memory;

if the first route parameter set is not already stored in the memory:

creating the first route parameter set;

creating the pointer;

associating the pointer with the first route parameter set; and storing the first route parameter set and the pointer in the memory; and if the first route parameter set is stored in memory, retrieving the pointer from the memory.

18. The apparatus of claim 17, wherein the operations further comprise comparing the first plurality of route parameter values with contents of a plurality of stored route parameter sets to determine whether the first route parameter set is already stored in the memory.

* * * * *